(12) United States Patent
Chang et al.

(10) Patent No.: US 7,010,318 B2
(45) Date of Patent: Mar. 7, 2006

(54) POWER CONTROL APPARATUS AND METHOD FOR A W-CDMA COMMUNICATION SYSTEM EMPLOYING A HIGH-SPEED DOWNLINK PACKET ACCESS SCHEME

(75) Inventors: Jin-Weon Chang, Seoul (KR);
Sung-Ho Choi, Songnam-shi (KR);
Kook-Heui Lee, Songnam-shi (KR);
Yong-Jun Kwak, Yongin-shi (KR);
Sung-Jin Kim, Suwon-shi (KR); Ju-Ho Lee, Suwon-shi (KR)

(73) Assignee: Samsung Electronics Co., Ltd., (KR)

(*) Notice: Subject to any disclaimer, the term of this patent is extended or adjusted under 35 U.S.C. 154(b) by 364 days.

(21) Appl. No.: 10/042,602

(22) Filed: Jan. 9, 2002

(65) Prior Publication Data
US 2002/0136193 A1 Sep. 26, 2002

(30) Foreign Application Priority Data
Jan. 13, 2001 (KR) .................................. 2001-2025

(51) Int. Cl.
*H04B 7/00* (2006.01)
(52) U.S. Cl. ...................... 455/522; 455/436; 455/437; 455/438; 455/439; 455/442; 455/524; 455/525; 370/331; 370/332
(58) Field of Classification Search ................ 455/522, 455/442, 69, 436, 437, 438, 439, 440, 441, 455/443, 524, 525; 370/331, 332
See application file for complete search history.

(56) References Cited

U.S. PATENT DOCUMENTS

| 5,574,972 | A | * | 11/1996 | Hulbert | 455/436 |
|-----------|---|---|---------|---------|---------|
| 5,901,354 | A |   | 5/1999  | Menich et al. | |
| 6,055,427 | A |   | 4/2000  | Ojaniemi | |
| 6,275,711 | B1| * | 8/2001  | Yamada et al. | 455/522 |
| 6,603,971 | B1| * | 8/2003  | Mohebbi | 455/437 |
| 6,754,505 | B1| * | 6/2004  | Baker et al. | 455/522 |

FOREIGN PATENT DOCUMENTS

| EP | 0 996 304 | 4/2000 |
|----|-----------|--------|
| WO | WO99/37111| 7/1999 |

OTHER PUBLICATIONS

British Examination Report dated Nov. 27, 2003 issued in a counterpart application, namely, Appl. No. GB0304543.2.

* cited by examiner

*Primary Examiner*—Nay Maung
*Assistant Examiner*—Raymond S. Dean
(74) *Attorney, Agent, or Firm*—Dilworth & Barrese LLP

(57) ABSTRACT

Disclosed is a method for controlling uplink transmission power in a handover region by a UE in communication with a Node B using an FCS scheme. The UE stores TPC commands received for a specific duration from a plurality of cells in an active set, if the UE enters in the handover region during communication with a current best cell. If a next best cell is selected from the plurality of the cells, the UE determines a transmission power offset by comparing TPC commands from the current best cell with TPC commands from the next best cell for the specific duration at a time point where the best cell is changed from the current best cell to the next best cell. The UE transmits initial transmission power for the next best cell at a transmission power level determined considering the transmission power offset.

5 Claims, 7 Drawing Sheets

POWER CONTROL APPARATUS AND METHOD FOR A W-CDMA COMMUNICATION SYSTEM EMPLOYING A HIGH-SPEED DOWNLINK PACKET ACCESS SCHEME

PRIORITY

This application claims priority to an application entitled "Apparatus and Method for Controlling Power for High Speed Down Link Packet Access in W-CDMA Communication System" filed in the Korean Industrial Property Office on Jan. 13, 2001 and assigned Serial No. 2001-2025, the contents of which are hereby incorporated by reference.

BACKGROUND OF THE INVENTION

1. Field of the Invention

The present invention relates generally to a communication system employing a high-speed downlink packet access (HSDPA) scheme, and in particular, to an apparatus and method for controlling transmission power upon a change of a best cell during communication in a fast cell selection (FCS) mode.

2. Description of the Related Art

A CDMA (Code Division Multiple Access) communication system typically employs a closed-loop power control technique in order to minimize data loss due to an abrupt change in a channel state (or channel condition). In the closed-loop power control technique, a receiver receives a signal transmitted from a transmitter and detects a power level of the received signal. Thereafter, the receiver determines whether to increase (up) or decrease (down) the detected power level based on the detected power level and then transmits power-up/down commands to the transmitter. If the measured power level of the signal received from the transmitter is lower than a preset level, the receiver transmits a power-up command. However, if the measured power level is higher than or equal to the preset level, the receiver transmits a power-down command to the transmitter.

The power-up/down commands are transmitted using a TPC (Transmission Power Control) bit in a dedicated physical control channel (DPCCH) of a dedicated physical channel (DPCH) established between the transmitter and the receiver. For example, the TPC bit is comprised of a single bit, and has a value of '1' or '0'. Herein, the value '1' indicates a power-up command, while the value '0' indicates a power-down command. Thus, upon receiving the TPC bit from the receiver, the transmitter determines its transmission power level based on a value of the received TPC bit. For example, the system may prescribe that the transmitter should increase the transmission power by 1 dB for TPC=1 (indicating a power-up command) and decrease the transmission power by 1 dB for TPC=0 (indicating a power-down command).

Meanwhile, when a user equipment (UE) is located in a soft handover (SHO) region, the UE receives signals from a plurality of active Node Bs belonging to an active set. Thus, there is a demand for a particular power control method in order to properly control power levels of the signals received from the active Node Bs. In the soft handover region, the UE sets up radio links to one or more cells managed by the active Node Bs. The UE receives downlink channel signals from two or more cells, measures power levels of the received downlink channel signals, and transmits a TPC bit having a corresponding bit value to the cells through the radio links. Therefore, when the UE is located in the soft handover region, it creates a TPC bit considering states of the downlink channel signals received from two or more cells.

The existing CDMA communication system employs a basic power control method in which the UE, if it is located in the soft handover region, determines to transmit a power-down command, even though any one of the established radio links has a power level higher than a preset power level. Basically, the UE determines to transmit a power-up command only when the signals received through all of the radio links have power levels lower than the preset power level.

In the case of an uplink, the UE located in the soft handover region may receive TPC commands from two or more cells. The UE then determines whether to increase or decrease the transmission power based on the TPC commands. In the existing CDMA communication system, upon receiving two or more TPC commands, the UE decreases its transmission power if any one of the received TPC commands indicates a power-down command. That is, the UE increases its transmission power only when all of the received TPC commands indicate a power-up command.

Meanwhile, a proposed high-speed downlink packet access (HSDPA) scheme refers to a data transmission scheme for transmitting on a high-speed downlink shared channel (HS-DSCH), which is a downlink data channel for supporting high-speed downlink packet data transmission, and its associated control channels in a future asynchronous mobile communication system, also known as a UMTS (Universal Mobile Telecommunication System) communication system. A typical technique newly introduced to support the HSDPA scheme includes (1) AMC (Adaptive Modulation and Coding), (2) HARQ (Hybrid Automatic Retransmission reQuest), and (3) FCS (Fast Cell Selection).

A brief description of the AMC, the HARQ and the FCS will be given herein below.

In the AMC scheme, if the UE reports the current channel state to a Node B, then the Node B determines a proper modulation mode and coding rate based on the channel state reported by the UE. The HARQ scheme is a retransmission technique for reducing errors on the physical channel. If an error is generated in the initially transmitted data, the HARQ scheme retransmits the same data as the initially transmitted data or transmits additional information for demodulation, thereby increasing demodulation probability of the transmission data. In the FCS scheme, the UE selects a best cell having the best link state among the radio links established by the UE, and reports cell selection information to the Node B of the best cell to receive data from the best cell.

In the HSDPA scheme, the UE receives data from only one Node B, even when it is located in the soft handover region. That is, since the HSDPA scheme supports the FCS scheme, only the Node B managing the best cell having the best reception state among two or more Node Bs with radio links established to the UE, transmits data to the UE. Here, the UE must provide all of the active Node Bs to which the radio links are established, with information on the cell selected by the UE as the best cell. In addition, the UE must transmit ACK (Acknowledgement)/NACK (Negative Acknowledgement) information for the HARQ to the Node B selected as the best cell. The ACK/NACK information is transmitted by the UE exclusively to the best cell, not to the other cells. Therefore, the information received from the respective Node Bs is not combined. The respective Node Bs, especially the Node B of the best cell must receive information from the UE at proper transmission power.

In the soft handover region, the UE accumulates the TPC commands for the current best cell #1 to which the radio link is currently established. For example, if the UE has received the TPC commands of 1,0,0,1,1,1 from the best cell #1, the accumulated transmission power level will be 2 dB. However, when the best cell is changed, i.e., when the current best cell is changed from the best cell #1 to a next (or new) best cell #2, the UE performs transmission power control on the best cell #2 using the accumulated transmission power level of 2 dB for the old (or previous) best cell #1.

When the best cell is changed from the current best cell to a next best cell, the existing CDMA communication system performs transmission power control according to the TPC command for the Node B selected as the next best cell #2 at the point where the best cell is changed, without considering the past TPC command for the Node B selected as the next best cell. For example, the exiting system performs transmission power control without considering the accumulated power level for the best cell #1. Therefore, when the UE transmits data to the next best cell immediately after the point where the best cell is changed, the transmission power level for the next best cell may not be proper. When the UE fails to have a transmission power level proper for the next best cell, the downlink data from the best cell may not be transmitted to the UE. This is because the current transmission power control is based on the soft combining scheme, whereas the HSDPA transmits and receives information of the respective links, which is not subject to the soft combining.

In the conventional transmission power control method based on the soft combining scheme, the UE in the soft handover region decreases its transmission power level upon receiving a power-down command from any one of the Node Bs in the active set. However, the HSDPA system supporting the FCS scheme for performing transmission power control on only the best cell performs transmission power control considering only the next best cell. Meanwhile, there is a great difference between the old best cell and the next best cell in terms of transmission power control tendency for a given duration (period) before the best cell is changed. As a result, there may be a considerable difference between a transmission power level of a signal actually transmitted from the UE and an initial transmission power level of the Node B selected as the next best cell.

SUMMARY OF THE INVENTION

It is, therefore, an object of the present invention to provide an apparatus and method for controlling transmission power upon a change of a best cell during communication in an FCS (Fast Cell Selection) mode in a communication system employing an HSPDA (High-Speed Downlink Packet Access) scheme.

To achieve the above and other objects, there is provided an apparatus for controlling uplink transmission power in a handover region by a UE in communication with a Node B using an FCS scheme. A power measure and best cell identification part measures transmission power of a received common pilot channel (CPICH) signal, and creates best cell maintain/change information by determining whether to maintain a current best cell or change the current best cell to a next best cell. A demultiplexer demultiplexes shared control channel (SHCCH) signals received from a plurality of Node Bs in an active set and outputs TPC (Transmission Power Control) commands. A TPC command memory stores the TPC commands output from the demultiplexer, received from the plurality of the Node Bs. A UE transmission power controller determines a transmission power control offset based on TPC commands stored for a specific duration from a time point where the best cell is changed from the current best cell to the next best cell, upon receipt of best cell change information indicting that the best cell must be changed from the current best cell to the next best cell, output from the power measure and best cell identification part, and then compensates initial transmission power for the next best cell based on the determined power control offset.

To achieve the above and other objects, there is provided a method for controlling uplink transmission power in a handover region by a UE in communication with a Node B using an FCS scheme. The UE stores TPC commands received for a specific duration from a plurality of cells in an active set, if the UE enters in the handover region during communication with a current best cell. If a next best cell is selected from the plurality of the cells, the UE determines a transmission power offset by comparing TPC commands from the current best cell with TPC commands from the next best cell for the specific duration at a time point where the best cell is changed from the current best cell to the next best cell. The UE transmits initial transmission power for the next best cell at a transmission power level determined considering the transmission power offset.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
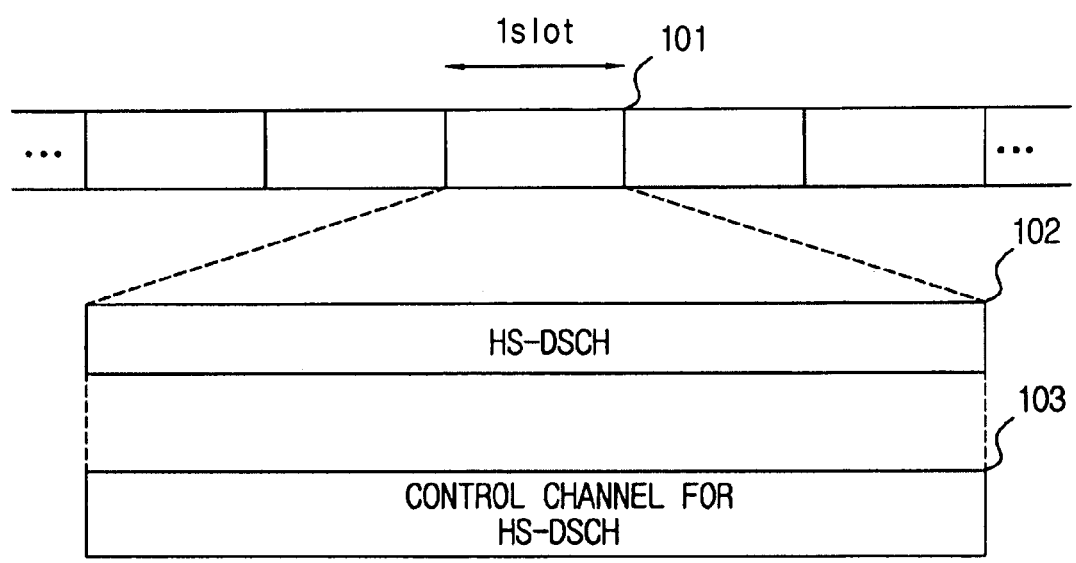
FIG. 1 schematically illustrates a channel structure of a general communication system employing a high-speed downlink packet access (HSDPA) scheme.

FIG. 1 schematically illustrates a channel structure of a general communication system employing a high-speed downlink packet access (HSDPA) scheme. The communication system employing the HSDPA scheme has two typical channels shown in FIG. 1. Reference numeral 101 represents one time slot in a time slot format of a downlink shared channel (DSCH). Each time slot includes a high-speed downlink shared channel (HS-DSCH) 102, which is a downlink data channel, and a control channel 103, e.g., a shared control channel (SHCCH), for transmitting control information for the HS-DSCH. For the HS-DSCH 102, an intact DSCH or a modified DSCH used in the existing asynchronous CDMA system can be used. The HS-DSCH 102 is used to transmit the HSDPA service data. The HS-DSCH 102, transmitting only the pure data, is shared by a plurality of UEs and is not subject to transmission power control (TPC). In contrast, the shared control channel 103, a channel for transmitting control information for the HS-DSCH 102, is a dedicated channel assigned to each UE and needs to be subject to transmission power control.

In the following description, the transmission power control method aims to control transmission power of the shared control channel 103. The transmission power control method can also be used to control transmission power of the HS-DSCH 102, when necessary.

The HSDPA scheme, as stated above, supports the FCS (Fast Cell Selection) scheme, so it requires a new transmission power control algorithm. That is, in a downlink transmission power control method used in the existing CDMA communication system, the UE having a radio link established to more than one Node B performs transmission power control by soft-combining TPC commands received from a plurality of Node Bs in an active set. However, in the case of the HSDPA system employing the FCS scheme, the UE can exchange data with only the Node B selected as the best cell among the Node Bs, having the best radio link connection state, i.e., having the best channel state. Hence, the UE carries out the transmission power control with only the Node B selected as the best cell.

Through an uplink channel, all the Node Bs establishing radio links without employing the FCS scheme receive a signal from the UE. However, in the HSDPA communication system employing the FCS, the MAC and the HARQ, if there is a great difference (offset) between information that should be received by the best cell from the UE (i.e., a modulation coding scheme (MCS) level for the AMC or an ACK/NACK signal level for the HARQ, and a transmission power level of the Node B selected as the best cell), it takes a considerably long time for the new Node B to correctly receive the information unless it initially compensates for the offset.

Therefore, the present invention will provide various methods of compensating for the initial power offset.

First Embodiment

The first embodiment of the present invention provides an uplink transmission power control method for a communication system employing the HSDPA scheme. The transmission power control method according to the first embodiment is to enable the best cell to correctly receive MCS level information necessary for the AMC by the Node B selected as a next best cell or, ACK/NACK information necessary for the HARQ, so that the UE performing uplink transmission power control based on data received from the old best cell can optimally communicate with the next best cell as quickly as possible (i.e., transition to an optimal transmission power control state, during a change of the best cell in the FCS scheme). The first embodiment will be described with reference to FIG. 2.

Figure 2:
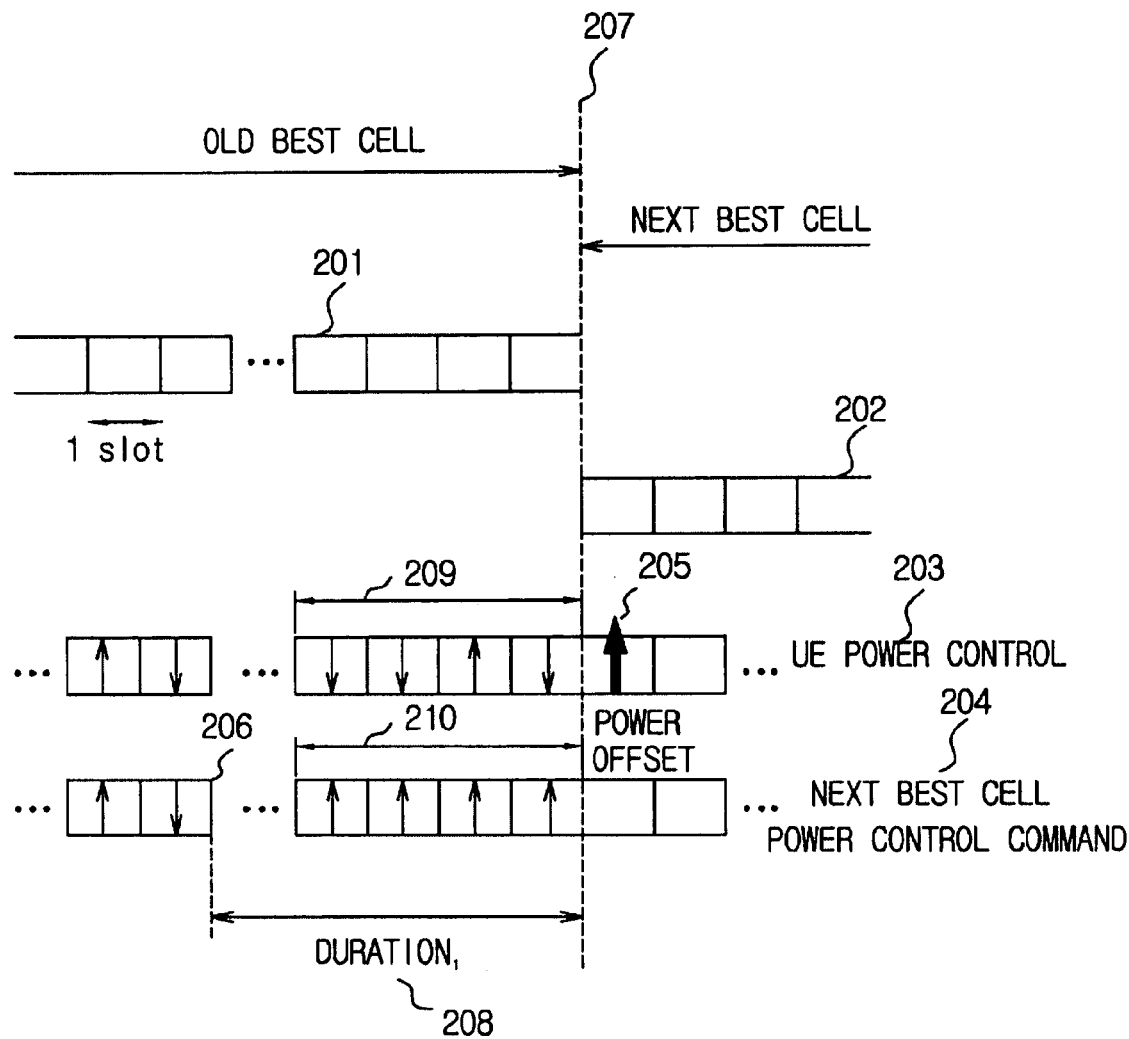
FIG. 2 illustrates a method for performing uplink transmission power control considering a transmission power offset during a change of the best cell in a mobile communication system employing the fast cell selection (FCS) according to a first embodiment of the present invention.

FIG. 2 illustrates a method for performing uplink transmission power control considering a transmission power offset during a change of the best cell in a mobile communication system employing the fast cell selection (FCS) according to the first embodiment of the present invention.

It will be assumed in FIG. 2 that a best cell is changed from an old best cell to a next best cell. Reference numeral 201 represents time slots of an HS-DSCH signal transmitted by the old best cell, while reference numeral 202 represents time slots of an HS-DSCH signal transmitted by the next best cell. Further, reference numeral 207 represents a point in time where the best cell is changed from the old best cell to the next best cell. That is, before the best cell change point 207, the UE receives data over the HS-DSCH 201 transmitted by the old best cell, and after the point 207, the UE receives data over the HS-DSCH 202 transmitted by the next best cell. Once the best cell is changed as stated above, the UE should determine a transmission power level proper for the next best cell to transmit information to the next best cell. However, in the existing HSDPA transmission power control method, the transmission power control has been performed to control the transmission power level to be proper for the old best cell before the best cell change point 207, so that immediately after the best cell change point 207, the transmission power level may not be proper to the next best cell. That is, a TPC (Transmission Power Control) command transmitted from the best cell to the UE immediately before the best cell is changed, may not be the same as the transmission power control operation actually performed by the UE.

In addition, reference numeral 203 represents an increase or decrease in the transmission power level, as the result of the transmission power control operation performed by the UE. It will be assumed that among the arrows indicating the transmission power control operations (executions) performed by the UE, an up arrow represents the increase in the transmission power level of the UE, while a down arrow represents the decrease in the transmission power level of the UE. Further, reference numeral 204 represents an increase or decrease in the transmission power level as the result of the transmission power control operation performed by the next best cell. It will be assumed that among the arrows indicating the TPC commands received at the next best cell, an up arrow represents a "power-up command" for increasing the transmission power level of the UE, while a down arrow represents a "power-down command" for decreasing the transmission power level of the UE.

In the case where the TPC command transmitted from the old best cell to the UE immediately before the best cell is changed is not the same as the transmission power control operation actually performed by the UE, if the existing transmission power control method is used, the next best cell may not correctly receive uplink information transmitted from the UE immediately after the change of the best cell. In this case, the information that must be correctly transmitted to the next best cell, e.g., MCS level information or ACK/NACK information, may not be correctly transmitted to the next best cell, so that the next best cell cannot correctly support the AMC and HARQ schemes.

Therefore, the first embodiment of the present invention determines a proper transmission power offset by calculating each history of the previous transmission power control operation performed by the UE and the TPC command from the next best cell, and then increases an initial transmission power level of the newly selected next best cell by as much as the transmission power offset before transmission of an uplink channel signal.

A detailed description will now be made of the transmission power control method according to the first embodiment of the present invention. The UE should store TPC command history values for the old best cell and the next best cell for a preset duration, at the best cell change point 207. Here, the "preset duration" where the UE should store the TPC command history value for the old best cell is represented by reference numeral 208. The duration 208 exists from a time slot just before the best cell change point 207 to a time slot for first transmitting a power-down command among the TPC commands transmitted from the next best cell to the UE in descending order of time, i.e., to a time slot just before the time slot 206. Here, the preset duration (duration$_1$) 208 will be referred to as a "TPC command history storing duration" for storing the history for the TPC command transmitted by the old best cell, i.e., the history indicating whether the TPC command during the duration was a power-up command or a power-down command. When comparing a TPC command from a Node B selected as the old best cell to a TPC command from a Node B selected as the next best cell, there is a case where the transmission power control operation performed by the UE is not the same as the TPC command transmitted from the next best cell to the UE. In this case, even though the next best cell has transmitted a power-up command to the UE, the UE will perform a transmission power control operation of decreasing the transmission power level. A transmission power offset given during transmission of an uplink channel signal at a first time slot 205 after the best cell change point 207 can be determined by comparing the TPC operation history stored by the UE with the TPC command history transmitted from the next best cell to the UE. For example, as represented by Equation (1) below, to calculate the transmission power offset $P_{offset}$ for reducing a transmission power level difference between the old best cell and the next best cell, the UE detects the number of power-down commands among the TPC commands stored for the TPC command history storing duration 208 for storing the TPC commands transmitted from the old best cell and then doubles the determined number of the power-down commands.

$$P_{offset} = 2 \times \sum_{duration_1} (UE_{down}) \quad (1)$$

In Equation (1), $P_{offset}$ represents a transmission power offset value compensated for at the first time slot after the change of the best cell, duration$_1$ represents a TPC command history storing duration, and $UE_{down}$ represents a power-down operation among the transmission power control operations performed by the UE.

Referring to FIG. 2, the next best cell transmits power-up commands for 4 time slots 210, while the old best cell transmits in sequence (i) a power-down command, (ii) a power-down command, (iii) a power-up command and a (iv) power-down command at 4 time slots 209 associated with the time slots 210. Therefore, at the best cell change point 207, 3 of the 4 time slots 209 for the old best cell are different from the time slots 210 for the next best cell in the TPC command value, and thus the transmission power control operation has been performed three times according to the power-down commands transmitted from the old best cell. Thus, from Equation (1), the transmission power offset $P_{offset}$ should be 2*3=6. As a result, the UE should compensate an initial transmission power control value by as much as the transmission power offset, so that the UE determines the initial transmission power control value considering the transmission power offset at the first time slot 205 after the best cell change point 207.

The first embodiment of the present invention has been described with reference to a method for determining an initial transmission power level considering a transmission power offset based on a history of the TPC commands transmitted from the old best cell for the time slot duration from the time point where the best cell is changed from the old best cell to the next best cell until a time slot just before the time slot for first transmitting the power-down command among the TPC commands transmitted from the next best cell in descending order of time. Next, a second embodiment of the present invention will be described with reference to FIG. 3.

Second Embodiment

Figure 3:
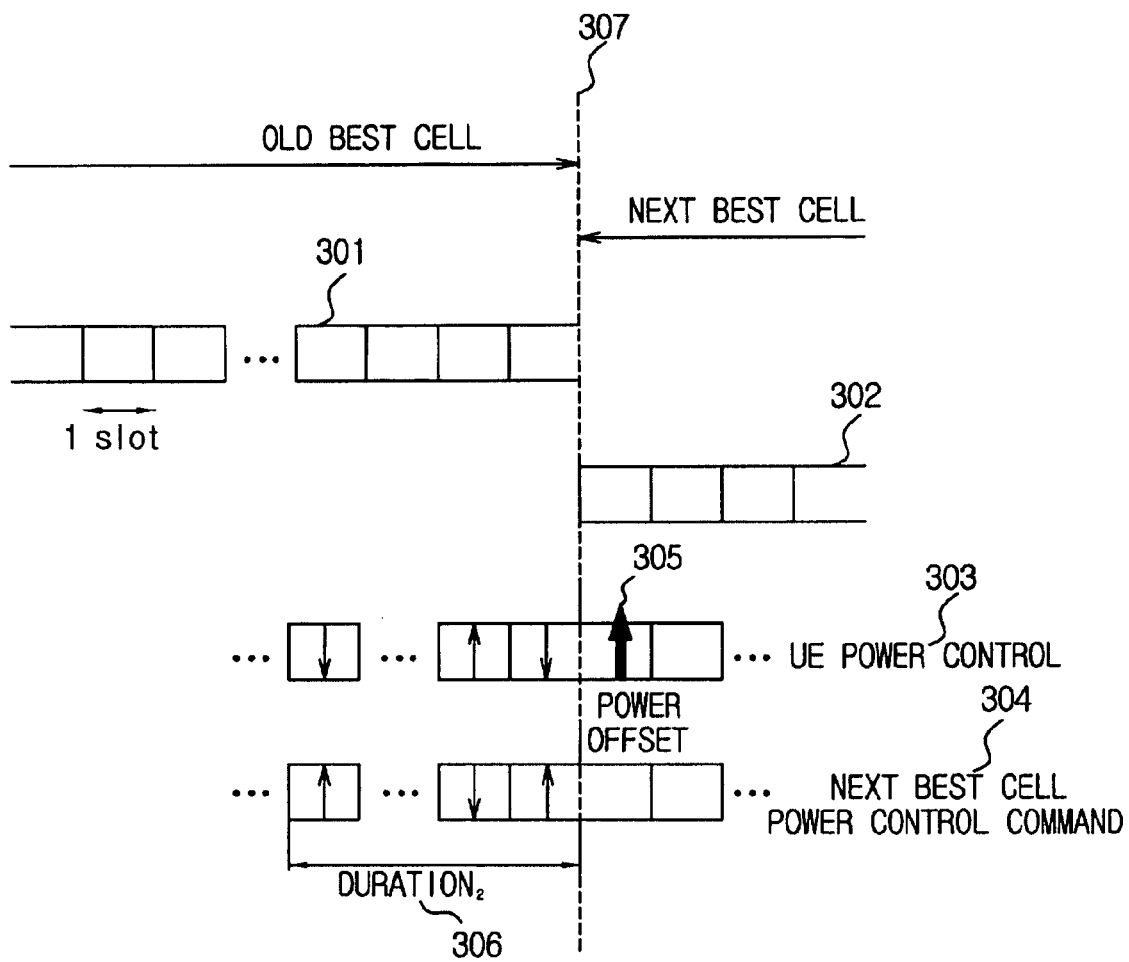
FIG. 3 illustrates a method for controlling uplink transmission power considering a transmission power offset during a change of the best cell in a mobile communication system employing the fast cell selection according to a second embodiment of the present invention.

FIG. 3 illustrates a method for controlling uplink transmission power considering a transmission power offset during a change of the best cell in a mobile communication system employing the fast cell selection according to the second embodiment of the present invention.

Referring to FIG. 3, reference numeral 301 represents time slots of an HS-DSCH signal transmitted by the old best cell, while reference numeral 302 represents time slots of an HS-DSCH signal transmitted by the next best cell. Further, reference numeral 303 represents transmission power control operations (executions) performed by the UE, while reference numeral 304 represents TPC commands transmitted by the next best cell. In addition, reference numeral 307 represents a point in time where the best cell is changed from the old best cell to the next best cell, and at the best cell change point 307. The UE should store TPC command history values for the old best cell and the next best cell for a preset duration (duration$_2$) 306. As illustrated in FIG. 3, the preset duration 306 includes a predetermined number of time slots from the time point 307 in descending order of time. The preset duration 306 will be referred to as a "TPC command history storing duration" as in the first embodiment. As described above, when the best cell is changed, a transmission power control operation performed by the UE before the change of the best cell may not be the same as the TPC command transmitted from the next best cell to the UE. Therefore, the UE should control the transmission power considering a transmission power offset 305 during transmission of an uplink channel signal at a first time slot after the best cell change point 307. Here, the UE can determine the transmission power offset by comparing a history of the TPC commands stored for the TPC command history storing duration 306 with a history of the TPC commands transmitted from the next best cell to the UE.

The transmission power offset according to the second embodiment of the present invention can be calculated in accordance with Equation (2) below. As represented by Equation (2), the transmission power offset is calculated by subtracting a difference between the number of increases in the transmission power level and the number of decreases in the transmission power level by the UE from a difference between the number of the power-up commands and the number of the power-down commands from the next best cell, during the TPC command history storing duration.

$$P_{offset} = \sum_{duration_2} (UTRAN_{up} - UTRAN_{down} - (UE_{up} - UE_{down})) \quad (2)$$

In Equation (2), $P_{offset}$ represents a transmission power offset value compensated for at the first time slot after the best cell change point 307, $duration_2$ represents a TPC command history storing duration, $UTRAN_{up}$ represents the number of power-up commands among the TPC commands transmitted from the next best cell to the UE, $UTRAN_{down}$ represents the number of power-down commands among the TPC commands transmitted from the next best cell to the UE, $UE_{up}$ represents the number of the power-up commands, executed by the UE, among the TPC commands transmitted from the old best cell, and $UE_{down}$ represents the number of power-down commands, executed by the UE, among the TPC commands transmitted from the old best cell.

Referring to FIG. 3, the next best cell has transmitted two power-up commands $UTRAN_{up}$ and one power-down command $UTRAN_{down}$. Further, the number of the power-up commands $UE_{up}$, executed by the UE, among the TPC commands transmitted by the old best cell is 1, while the number of the power-down commands $UE_{down}$, executed by the UE, among the TPC commands transmitted by the old best cell is 2. From Equation (2), the transmission power offset is (2−1−(1−2)=2.

The second embodiment of the present invention has been described with reference to a method for determining an initial transmission power level considering a transmission power offset based on a history of the TPC commands transmitted from the old best cell for a preset time slot duration at the time point where the best cell is changed from the old best cell to the next best cell. Next, a third embodiment of the present invention will be described with reference to FIG. 4.

Third Embodiment

Figure 4:
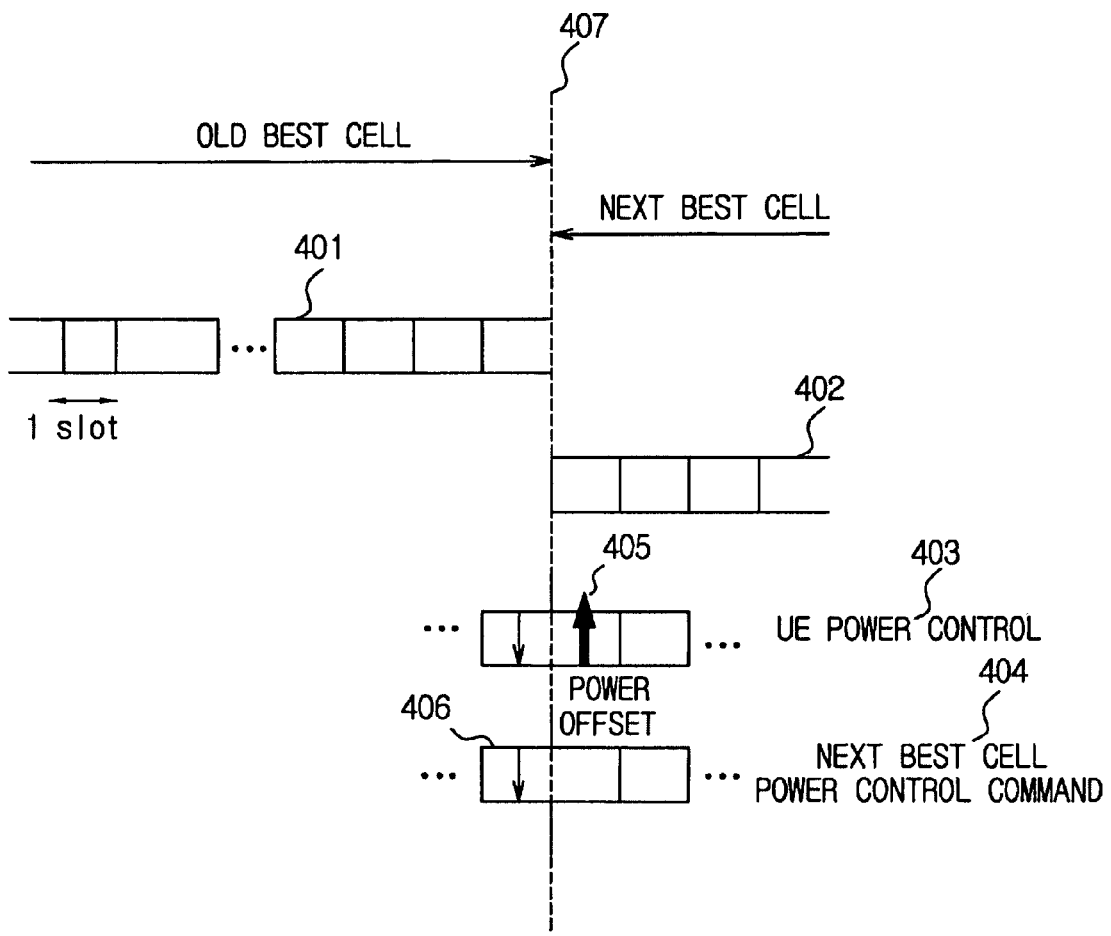
FIG. 4 illustrates a method for controlling uplink transmission power considering a transmission power offset during a change of the best cell in a mobile communication system employing the fast cell selection according to a third embodiment of the present invention.

FIG. 4 illustrates a method for controlling uplink transmission power considering a transmission power offset during a change of the best cell in a mobile communication system employing the fast cell selection according to the third embodiment of the present invention.

Referring to FIG. 4, reference numeral 401 represents time slots of an HS-DSCH signal transmitted by the old best cell, while reference numeral 402 represents time slots of an HS-DSCH signal transmitted by the next best cell. Further, reference numeral 403 represents TPC commands transmitted by the old best cell and executed by the UE, while reference numeral 404 represents TPC commands transmitted by the next best cell. In addition, reference numeral 407 represents a point in time where the best cell is changed from the old best cell to the next best cell. The UE should store the TPC commands transmitted by the old best cell and the next best cell for a preset time duration in descending order of time on the basis of the best cell change point 407, i.e., for a time slot 406 just before the best cell change point 407. If the TPC command transmitted by the next best cell at the time slot 406 just before the best cell change point 407 is a power-down command, the UE sets the transmission power offset to 0 and then performs the transmission power control in the same method as the conventional transmission power control method. However, if the TPC command transmitted by the next best cell at the time slot 406 just before the best cell change point 407 is a power-up command, the UE determines a transmission power level at a first time slot after the best cell change point 407, considering the preset transmission power offset.

The FCS scheme has a specific time delay in changing the best cell from the old best cell to the next best cell in the soft handover region. That is, in the HSDPA scheme, if it is recognized that the best cell must be changed, generally the next best cell has a better radio link. In this case, however, signaling or new transmission power control is required, so that the best cell is changed after the specific time delay. For the delay time, preparations for the change to the next best cell should be made, and the transmission power control should also be performed, preparing for the change to the next best cell. Accordingly, the present invention provides a new power control method for newly declaring the delay time in order to solve the time delay problem in the best cell changing process. A detailed description of the method will be made herein below with reference to several embodiments.

Figure 5:
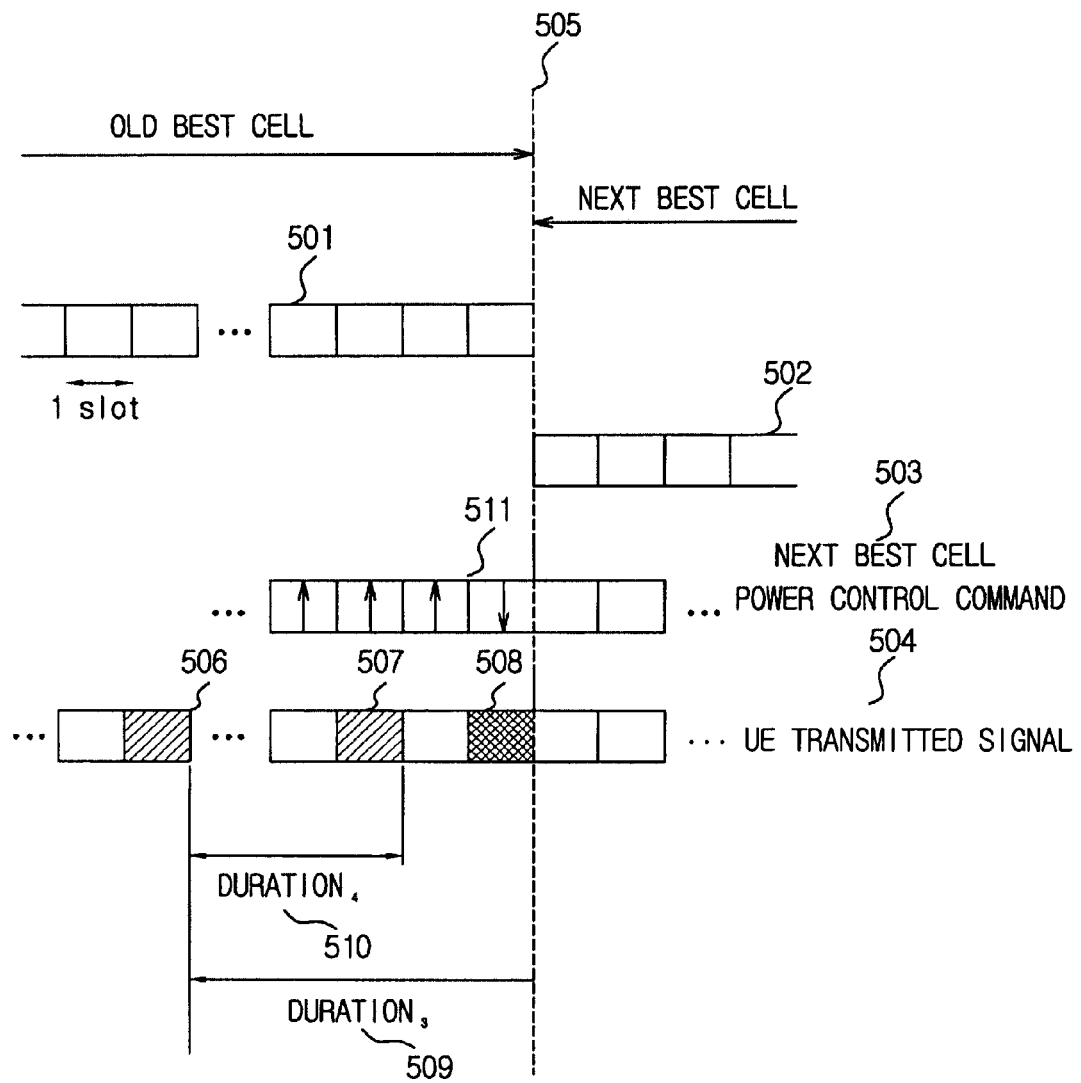
FIG. 5 illustrates a method for controlling uplink transmission power considering a transmission power offset during a change of the best cell in a mobile communication system employing the fast cell selection according to fourth and fifth embodiments of the present invention.

FIG. 5 illustrates a method for controlling uplink transmission power considering a transmission power offset during a change of the best cell in a mobile communication system employing the fast cell selection according to fourth and fifth embodiments of the present invention.

Fourth Embodiment

Referring to FIG. 5, reference numeral 501 represents time slots of an HS-DSCH signal transmitted by the old best cell, while reference numeral 502 represents time slots of an HS-DSCH signal transmitted by the next best cell. Further, reference numeral 503 represents TPC commands transmitted from the next best cell to the UE, while reference numeral 504 represents time slots of an uplink channel signal transmitted from the UE to the Node B. Although the UE recognizes that the best cell should be changed at a time slot 506 among the time slots 504 of the uplink channel signal, it is impossible for the UE to immediately transmit data to the Node B selected as the next best cell at the time slot 506 because of a time delay for signaling and transmission power control as stated above.

Of the time slots 504 of the uplink channel signal, a time slot 508 is used by the UE to transmit best cell change information for signaling and transmission power control proper for the next best cell. The time slot 508 can be defined as a time slot delayed either one frame or a predetermined number of time slots after the time slot 506 so that the best cell can be changed from the old best cell to the next best cell.

Alternatively, the time slot for transmitting the best cell change information can also be defined as a time slot 511 over which the next best cell has first transmitted a power-down command after the time slot 506 at which the UE recognized the best cell should be changed. That is, the time slot 508 is a time slot over which the next best cell has first transmitted the power-down command to the UE after the time slot 506. In addition, a preset duration ($duration_3$) 509 refers to a time duration from the time slot 506 at which the UE recognized the best cell should be changed, until a point in time 505 where the best cell is actually changed from the old best cell to the next best cell in response to the best cell change information transmitted from the UE at the time slot 508. In the fourth embodiment, during the delay time ($duration_3$) 509, the UE controls its transmission power according to the TPC command from the next best cell, so that it can properly control the transmission power even through the best cell is changed from the old best cell to the next best cell.

In some cases, the UE should transmit information necessary for the old best cell in the time duration from the time point where the next best cell is selected till the time point where the best cell is actually changed from the old best cell to the next best cell. The "information necessary for the old best cell" may include ACK/NACK information used in the HARQ scheme. Therefore, there is a demand for a transmission power control method of enabling both the old best cell and the next best cell to correctly receive the signal transmitted from the UE until the time point where the information necessary for the old best cell should be transmitted, after the best cell is selected. Thus, a fifth embodiment of the present invention will provide a transmission power control method proper for both the old best cell and the next best cell in the time delay duration.

Fifth Embodiment

The fifth embodiment of the present invention will also be described with reference to FIG. 5. As stated above, FIG. 5 shows the time slots 501 of the HS-DSCH signal transmitted by the old best cell and the time slots 502 of the HS-DSCH signal transmitted by the next best cell. Also, the UE recognized at the time slot 506 that it should change the best cell due to the bad radio link state while transmitting the time slots 504 of the uplink channel to the Node B. The duration (duration$_3$) 509 refers to a time duration from the time point, which the UE recognized the best cell should be changed, until the time point 505 where the best cell is actually changed from the old best cell to the next best cell. When the UE finally transmits at a time slot 507 the ACK/NACK information to the old best cell in the time duration 509, a time duration from the time point where the UE recognized the best cell should be changed until the time slot 507 where the UE finally transmits the information to the old best cell, will be defined as a time duration (duration$_4$) 510. The fifth embodiment of the present invention provides a method for controlling uplink transmission power of the UE for the time duration 510.

For the time duration 510, the UE transmits signals at a transmission power level proper to both the old best cell and the next best cell, so that both the old best cell and the next best cell can receive the information transmitted by the UE. The UE decreases its transmission power level, only when a TPC command from the old best cell and a TPC command from the next best cell are both power-down commands. Otherwise, if any one of the TPC commands received from the old best cell and the next best cell is a power-up command, the UE increases its transmission power level. By doing so, the fifth embodiment of the present invention performs transmission power control proper for both the old best cell and the next best cell for the delay time.

Sixth Embodiment

A method for controlling transmission power of a downlink channel such as a shared control channel (SHCCH) for transmitting control information for the HS-DSCH of FIG. 1 according to the sixth embodiment of the present invention will be described with reference to FIG. 6. In the conventional power control method, all the cells having radio links have their data links, so that the UE transmits a power-down command to the Node B, when any one of the cells has a good data link state. However, if the conventional transmission power control method is used along with the FCS scheme, the power control may not be performed to be proper for the current best cell, so that the UE cannot receive the information that must be received from the current best cell. For this reason, when using the FCS, the downlink channel performs power control according to the TPC command from the UE, so it should use the transmission power control method proper for the best cell. The present invention provides a new transmission power control method for the downlink channel with reference to various embodiments.

Figure 6:
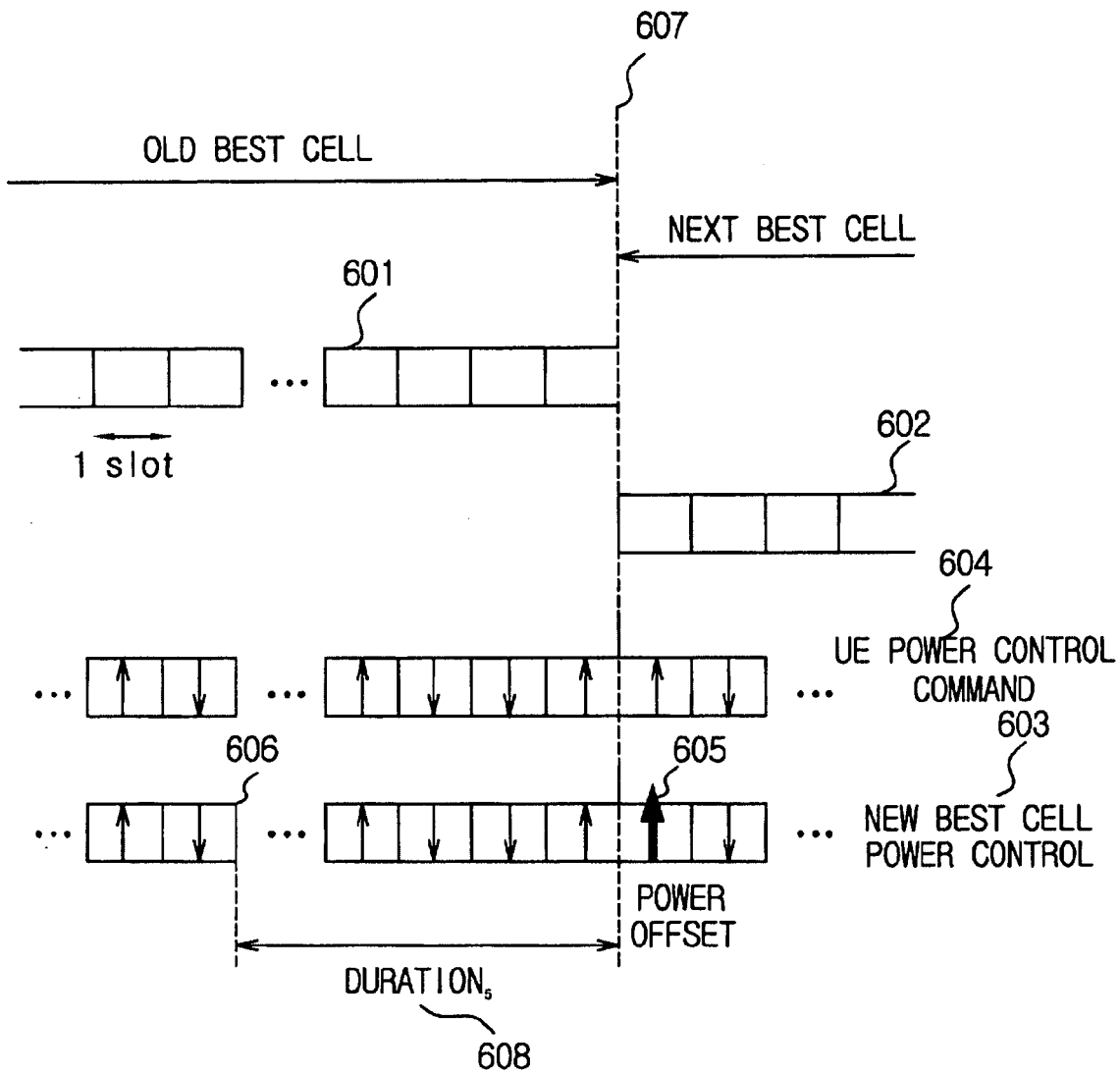
FIG. 6 illustrates a method for controlling downlink transmission power considering a transmission power offset during a change of the best cell in a mobile communication system employing the fast cell selection according to sixth seventh and eighth embodiments of the present invention.

FIG. 6 illustrates a method for controlling downlink transmission power considering a transmission power offset during a change of the best cell in a mobile communication system employing the fast cell selection according to the sixth, seventh and eighth embodiments of the present invention.

Referring to FIG. 6, reference numeral 601 represents time slots of an HS-DSCH signal transmitted by the old best cell, while reference numeral 602 represents time slots of an HS-DSCH signal transmitted by the next best cell. Further, reference numeral 603 represents TPC commands executed by the next best cell, while reference numeral 604 represents TPC commands transmitted from the UE to respective cells. In addition, reference numeral 606 represents a time slot where the next best cell recognized that the best cell should be changed, and reference numeral 605 represents a time slot where the best cell is changed. The sixth embodiment of the present invention applies the transmission power control method for the uplink channel described in the first to third embodiments, to the downlink channel as well as the uplink channel. That is, when the best cell is changed, a given transmission power offset is applied to the transmission power level of the next best cell for signal transmission. Reference numeral 605 represents a transmission power offset applied at the first time slot after a time point 607 where the best cell is changed to the next best cell. Here, the next best cell determines the transmission power offset using the TPC commands for a preset duration, or a duration (duration$_5$) 608 from the time slot 606 where the next best cell recognized that the best cell should be changed, until the time point 607 where the best cell is changed.

Seventh Embodiment

The seventh embodiment of the present invention provides a method for controlling transmission power for the duration from the point where the best cell recognized that it should be changed until the point where the best cell is changed. In FIG. 6, the duration (duration$_5$) 608 exists from the point 606 where the best cell recognized that it should be changed, to the point 607 where the best cell is actually changed. For the duration 608, the UE should receive correct information from both the old best cell and the next best cell. The UE measures its channel state to analyze states of data links to both of the two cells. The UE transmits a power-down command only when both of the two cells have the good data link state. If at least one of the old best cell and the next best cell has a bad data link state, the UE transmits a power-up command.

Eighth Embodiment

In the eighth embodiment of the present invention, when more than two cells among a plurality of cells having radio links connected to one UE belong to one Node B, the plurality of the cells constitute one radio link set. In this case, since the respective cells constituting the radio link set transmits the same information, the UE performs transmission power control considering the radio link state of all the cells included in the radio link set, rater than performing the transmission power control considering the radio link state of one best cell. That is, in the case where the radio link set is established, the UE combines information received from a plurality of cells in the same Node B. Thus, it is possible for the UE to correctly receive the information at a lower transmission power level than when the transmission power is controlled considering only one best cell. Therefore, the transmission power control method according to the eighth embodiment of the present invention reduces the influence of the noises, which may be induced in the system.

The transmission power control methods according to the first to eighth embodiments of the present invention have been described herein above. Next, a structure of the UE for performing the transmission power control methods according to the eight embodiments of the present invention will be described with reference to FIG. 7.

Figure 7:
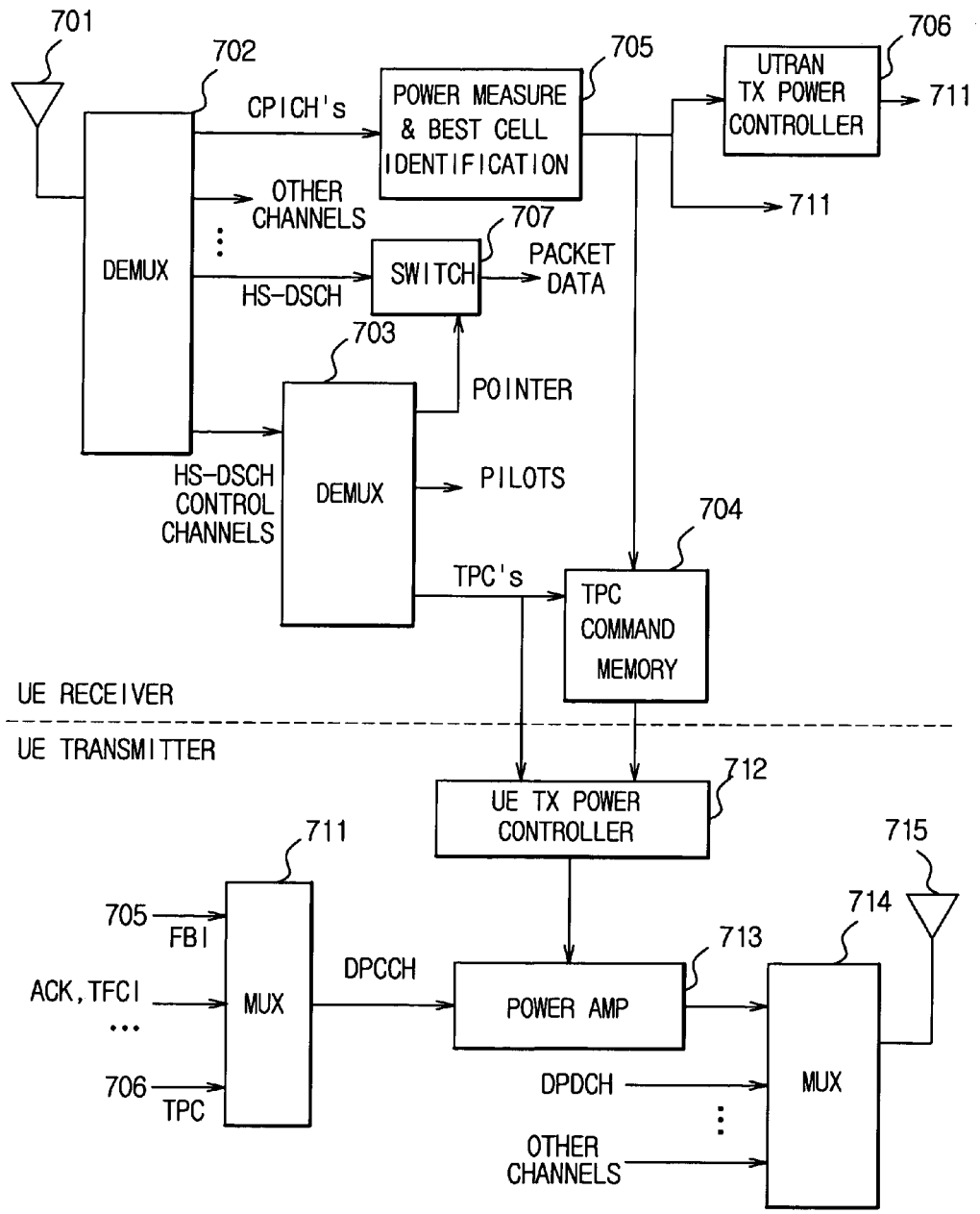
FIG. 7 illustrates a structure of the UE for performing the transmission power control method according to the present invention.

FIG. 7 illustrates a structure of the UE for performing the transmission power control method according to the present invention. Referring to FIG. 7, the UE is divided into a receiver and a transmitter, and a description of the receiver will be made first.

The receiver receives a radio frequency (RF) signal transmitted on the air by the Node B through its antenna 701, and provides the received RF signal to a demultiplexer 702. The demultiplexer 702 demultiplexes the output signal of the reception antenna 701 into respective channel signals. Here, the signals output from the demultiplexer 702 include a CPICH (Common Pilot Channel) signal, an HS-DSCH signal, a channel signal, e.g., SHCCH signal, for transmitting control information for the HS-DSCH, and other channel signals.

Of the signals output from the demultiplexer 702, the CPICH signal is provided to a power measure and best cell identification part 705, which detects information on the currently received transmission power level and the current best cell maintain/change information based on the provided CPICH signal. Of the information detected by the power measure and best cell identification part 705, the information on the currently received transmission power level is provided to a UTRAN transmission power controller 706. The UTRAN transmission power controller 706 determines the transmission power in the same methods as described in the eight embodiments of the present invention based on the transmission power level of the current best cell, output from the power measure and best cell identification part 705, and provides the determined transmission power value to a multiplexer 711. The intact current best cell maintain/change information output from the power measure and best cell identification part 705 is also provided to the multiplexer 711.

The HS-DSCH signal output from the demultiplexer 702 is provided to a switch 707, and the HS-DSCH control channel signal, i.e., the SHCCH signal, output from the demultiplexer 702 is provided to a demultiplexer 703. The demultiplexer 703 demultiplexes the SHCCH signal into a pointer signal, a pilot signal and a TPC command signal. Here, the pointer signal is an HS-DSCH Indicator (HI) signal indicating whether the UE should receive the HS-DSCH at the current time slot, and the pointer signal is provided to the switch 707. If the pointer signal indicates that the UE should receive the HS-DSCH signal, the switch 707 is switched ON to modulate the HS-DSCH signal provided from demultiplexer 702.

The TPC command signal output from the demultiplexer 703 is provided to a TPC command memory 704 along with the information output from the power measure and best cell identification part 705, and the TPC command memory 704 stores the TPC command signal from the Node B having a radio link to the UE for a specific duration. The TPC command signals output for the specific duration from the TPC command memory 704 and the TPC command signal output from the demultiplexer 703 are provided to a UE transmission power controller 712. The UE transmission power controller 712 controls a power amplification gain of a power amplifier 713 based on the TPC command signals output for the specific duration from the TPC command memory 704 and the TPC command signal output from the demultiplexer 703.

The multiplexer 711 multiplexes the TPC command signal output from the UTRAN transmission power controller 706, the best cell information (or feedback information (FBI)) output from the power measure and best cell identification part 705, an ACK signal and a TFCI (Transport Format Combination Indicator) signal, and outputs the multiplexed signal as a DPCCH (Dedicated Physical Control Channel) signal. The DPCCH signal output from the multiplexer 711 is provided to the power amplifier 713, which amplifies the DPCCH signal under the control of the UE transmission power controller 712 and provides the amplified DPCCH signal to a multiplexer 714. The multiplexer 714 multiplexes the DPCCH signal output from the power amplifier 713 with the other channel signals such as the DPDCH (Dedicated Physical Data Channel) signal, and transmits the multiplexed signals to the Node B through a transmission antenna 715.

As described above, the present invention can compensate an initial transmission power value of the next best cell considering the transmission power offset determined based on an accumulated TPC value of the old best cell at the time point where the best cell is changed from the old best cell to the next best cell, thus making it possible to perform more accurate power control in the mobile communication system employing the fast cell selection.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling uplink transmission power in a handover region by a UE (User Equipment) in communication with a Node B using an FCS (Fast Cell Selection) scheme, comprising the steps of:

storing TPC (Transmission Power Control) commands received for a specific duration from a plurality of cells in an active set, if the UE enters the handover region during communication with a current best cell;

selecting a cell among the plurality of cells in the active set as a next best cell using the stored TPC commands;

comparing the TPC commands from a current best cell with the TPC commands from the next best cell for the specific duration, which is defined by a number of time slots counted backward from a point in time at which handover is executed from the current best cell to the next best cell;

determining a transmission power offset based on a difference between numbers of the TPC commands having different values; and transmitting initial transmission power for the next best cell at a transmission power level determined considering the transmission power offset.

2. The method as claimed in claim 1, wherein the transmission power offset is calculated by $$P_{offset} = 2 \times \sum_{duration_1} (UE_{down})$$

where $P_{offset}$ represents the transmission power offset, $duration_1$ represents the specific duration, and $UE_{down}$ represents a number of power-down commands among the TPC commands transmitted by the current best cell during the specific duration.

3. The method as claimed in claim 1, wherein the transmission power offset is calculated by $$P_{offset} = \sum_{duration_2} (UTRAN_{up} - UTRAN_{down} - (UE_{up} - UE_{down}))$$

where $P_{offset}$ represents the transmission power offset, $duration_2$ represents the specific duration, $UTRAN_{up}$ represents a number of power-up commands among the TPC commands transmitted from the next best cell to the UE, $UTRAN_{down}$ represents a number of power-down commands among the TPC commands transmitted from the next best cell to the UE, $UE_{up}$ represents a number of power-up commands among the TPC commands transmitted by the current best cell, and $UE_{down}$ represents a number of power-down commands among the TPC commands transmitted by the current best cell.

4. The method as claimed in claim 1, wherein the transmission power offset is set to '0' for a power-down command, and to a preset value for a power-up command.

5. An apparatus for controlling uplink transmission power in a handover region by a UE (User Equipment) in communication with a Node B using an FCS (Fast Cell Selection) scheme, comprising:

a power measure and best cell identification part for measuring transmission power of a received common pilot channel (CPICH) signal, and creating best cell maintain/change information by determining whether to maintain a current best cell or change the current best cell to a next best cell;

a demultiplexer for demultiplexing shared control channel (SHCCH) signals received from a plurality of Node Bs in an active set and outputting TPC (Transmission Power Control) commands;

a TPC command memory for storing the TPC commands output from the demultiplexer, received from the plurality of the Node Bs; and a UE transmission power controller for determining a transmission power offset based on TPC commands stored for a specific duration, which is defined by a number of time slots counted backwards, upon receipt of best cell change information indicating that the best cell must be changed from the current best cell to the next best cell, and then compensating initial transmission power for the next best cell based on the determined power control offset.

* * * * *